United States Patent
Bishop et al.

(10) Patent No.: US 6,468,024 B2
(45) Date of Patent: Oct. 22, 2002

(54) APPARATUS AND METHOD FOR ORIENTING AND STACKING GENERALLY PLANAR WORKPIECES

(75) Inventors: Charles W. Bishop, Litchfield; Larry R. Ballard, Gillespie, both of IL (US)

(73) Assignee: Alpine Engineered Products, Inc., Pompano Beach, FL (US)

( * ) Notice: Subject to any disclaimer, the term of this patent is extended or adjusted under 35 U.S.C. 154(b) by 0 days.

(21) Appl. No.: 09/735,576

(22) Filed: Dec. 12, 2000

(65) Prior Publication Data

US 2002/0076315 A1 Jun. 20, 2002

(51) Int. Cl.[7] .............................................. B65G 57/16
(52) U.S. Cl. .................... 414/788.3; 414/768; 414/769; 414/778; 414/798.4; 414/802
(58) Field of Search ................................. 414/760, 768, 414/769, 778, 798.4, 788.3, 802

(56) References Cited

U.S. PATENT DOCUMENTS

| | | | | |
|---|---|---|---|---|
| 2,527,024 A | * | 10/1950 | Mitchell | 414/760 |
| 2,571,840 A | * | 10/1951 | Curlee | 414/798.2 |
| 2,761,561 A | * | 9/1956 | Young | 414/760 |
| 3,160,287 A | * | 12/1964 | Hinchliffe | 414/768 |
| 3,200,966 A | * | 8/1965 | Peterson et al. | 414/768 |
| 3,379,307 A | * | 4/1968 | Dron | 414/798.2 |
| 5,044,876 A | * | 9/1991 | Stohlquist | 414/798.2 |
| 5,392,908 A | | 2/1995 | Black | 206/321 |
| 5,630,697 A | * | 5/1997 | Black, Jr. | 414/798.6 |
| 5,636,494 A | * | 6/1997 | Black, Jr. | 53/399 |
| 5,906,264 A | * | 5/1999 | Black et al. | 198/374 |

* cited by examiner

Primary Examiner—Kathy Matecki
Assistant Examiner—Sang Kim
(74) Attorney, Agent, or Firm—Crutsinger & Booth (57) ABSTRACT

Disclosed are machines and methods of orienting and stacking a stream of workpieces when it is desirable to stack at lease some of the workpieces in a face-to-face or back-to-back orientation. The apparatus has a receiving assembly for receiving a continuous stream of workpieces. A flipping assembly follows the receiving assembly for selectively flipping selected workpieces onto their opposing faces. Downstream from the flipping assembly, a stacking guide is positioned for guiding the workpieces into stacks for further manual or automated handling.

15 Claims, 5 Drawing Sheets

APPARATUS AND METHOD FOR ORIENTING AND STACKING GENERALLY PLANAR WORKPIECES

TECHNICAL FIELD

The present inventions relate to an automated apparatus and method for orienting and stacking generally planar workpieces. By way of example and not limitation, the preferred embodiment of the invention described herein relates to orienting and stacking truss connector plates having a generally smooth side and a plurality of impaling members, or teeth, extending from the other side thereof.

BACKGROUND OF THE INVENTIONS

Truss connector plates are generally planar metal plates cut from rolled or sheet steel by a punch press. Truss connector plates are usually substantially rectangular and have a plurality of teeth projecting from one side for gripping the lumber on which the truss connector plate is used. The truss connector plates also have a substantially planar backside. The truss connector plates are used to join two or more aligned pieces of lumber in the construction of a truss such as those used in wooden frame building construction.

It is known practice to orient and bundle truss connector plates to facilitate handling and shipping. The truss connector plates are arranged so that their toothed faces are aligned in tooth-to-tooth pairs. The pairs are then positioned adjacent to other pairs so that the truss connector plates of each pair are back-to-back with the truss connector plates of each adjacent pair. The truss connector plate stacks are then further handled or packaged.

It is known in the art to use automated apparatus and associated methods to produce truss connector plate bundles. Such apparatus and methods are exemplified by U.S. Pat. No. 5,636,494 to William H. Black, Jr., and by U.S. Pat. No. 5,906,264 to William H. Black et al. The prior art is an improvement over assembling bundles of truss connector plates by hand, but is complex and requires substantially different machinery for each size or number of truss connector plates exiting the punch press. Additionally, the prior art is limited to handling of either a stream of truss connector plates consisting of a single column of truss connector plates, as in Black et al., or a stream consisting of an even number of columns of truss connector plates, e.g., four, as in Black Jr.

SUMMARY OF THE INVENTIONS

The present inventions contemplate new automated apparatus and methods for producing stacks of generally planar workpieces output in a continuous stream from a manufacturing process. In general, the apparatus and methods include assemblies and methods for receiving, selectively flipping, and stacking generally planar workpieces. Each of the workpieces has opposing faces, a face side and a back side, and it is desired to reorient at least one of the workpieces to its opposing face, and to stack all of them.

The apparatus has a receiving assembly for receiving a continuous stream of workpieces output from a manufacturing process. A flipping assembly is located downstream from the receiving assembly for selectively flipping one or more of the workpieces to its opposing face. A stacking guide receives workpieces exiting both the flipping assembly and the receiving assembly and guides them into stacks.

The flipping assembly has a flipping arm with two selectable operative positions; a first position for receiving a work piece from the receiving assembly, and a second position for directing a work piece, once received by the flipping assembly, to the stacking guide from the flipping assembly or for allowing a work piece to enter directly to the receiving assembly. Generally, the flipping assembly is electrically connected to a flipping control assembly, which includes devices for sensing workpieces and for activating the flipping assembly according to sensor inputs and preset control instructions.

According to one aspect of the invention, the flipping assembly can be set to flip alternate workpieces in a continuous stream. According to another aspect of the invention, the apparatus can receive, orient, and stack a continuous stream of two or more parallel columns of workpieces.

BRIEF DESCRIPTION OF THE DRAWINGS

The accompanying drawings are incorporated into and form a part of the specification to illustrate several examples of the present inventions. These drawings together with the description serve to explain the principals of the inventions. The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which.

DETAILED DESCRIPTION OF THE PREFERRED EMBODIMENT

The present inventions will be described by referring to drawings of apparatus and methods showing various examples of how the inventions can be made and used. In these drawings reference characters are used throughout the several views to indicate like or corresponding parts. In the description that follows, particular terms are used in reference to the positional relationship of enumerated structures. The term "downstream" used herein refers to the general direction workpieces travel as they move in the direction of a finished stack of workpieces. Conversely, "upstream" refers to the opposite direction. Accordingly, upstream and downstream together define the "longitudinal" axis. It follows that the axis perpendicular to the longitudinal axis is referred to as the "transverse" axis.

The continuous output of a producing-producing machine or process, operated upon by the invention, is referred to as an output "stream", or work piece "stream". The stream begins at the output of a producing-producing machine or process and ends with a finished stack of workpieces. The stream may be aligned in a single longitudinal "column" of workpieces or in multiple parallel columns of workpieces. The transversely adjacent workpieces of parallel columns in a stream are referred to as a work piece stream "rank", or "rank" of workpieces.

Figure 1:
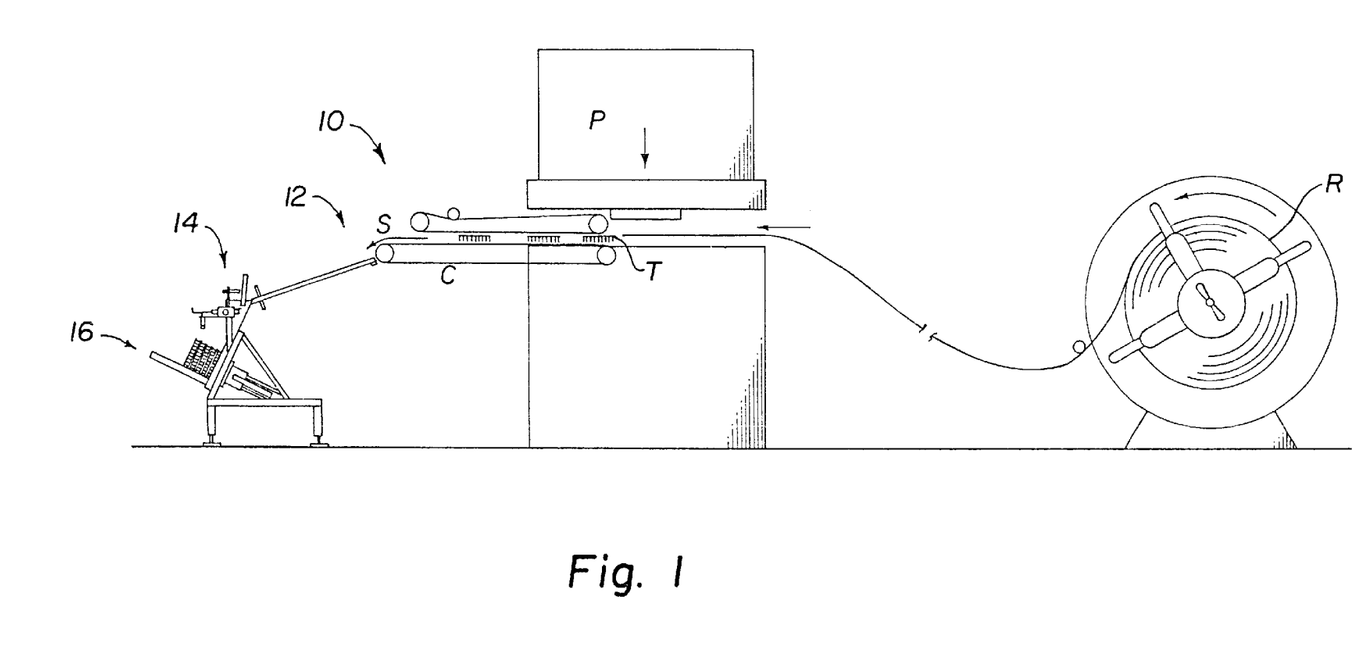
FIG. 1 is a side view of one example of the stacker apparatus of the present invention shown receiving the output of a punch press.

In FIG. 1, one embodiment of stacker apparatus 10 for use in orienting and stacking truss connector plates according to the invention is shown. The details of the stacker apparatus 10 and methods are further illustrated in FIGS. 2 through 9. In general, the stacker apparatus 10 includes three major assemblies, each having subassemblies further described below. The three major assemblies are a receiving assembly 12, a flipping assembly 14, and a stacking guide 16.

Figure 2:
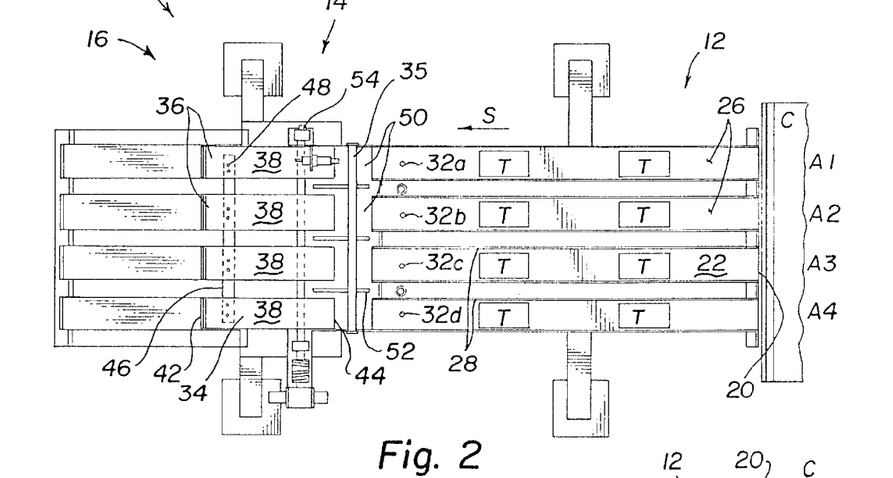
FIG. 2 is a top view of the stacker apparatus of FIG. 1.

Preferably, the apparatus and methods contemplate receiving the truss connector plate output stream S of a truss connector plate producing punch press P. The punch press P generally forms truss connector plates T from rolled material R. The punch press P outputs truss connector plates T in a continuous stream S of one column or multiple parallel columns. FIG. 2 shows parallel columns A1, A2, A3 and A4 of truss connector plates. The punch press P generally includes an adjacent conveying surface C downstream from the punch press P. The punch press conveying surface C has a substantially planar conveyor or roller surface, which may be powered or sloped to facilitate movement of the truss connector plate output downstream. Other methods of producing truss connector plates or output conveying apparatus and methods may be used in the art. For example, large truss connector plates are usually produced in a stream consisting of a single column of truss connector plates. The punch press P, truss connector plates T, roll material R, and conveyor C, alluded to but not described are not part of the invention.

The receiving assembly 12 is positioned with its upstream end 20 downstream from the conveying surface C. Preferably, the receiving assembly 12 has a generally planar surface 22 sloping downstream toward the flipping assembly 14 defining a ramp 24. The receiving assembly 12 of the preferred embodiment has a smooth flat surface 22 of stainless steel. Other hard, wear resistant, surfaces may be employed. In the preferred embodiment, the truss connector plates T move downstream by the force of gravity, but a roller or powered conveyor surface may be used to facilitate movement of the workpieces downstream.

The surface 22 is divided into longitudinal chutes 26 by a number of vertical dividers 28 designed to maintain separation of the columns in a stream S of truss connector plates T. The receiving assembly chutes could be made on a single flat surface with dividers, or by connecting independently constructed chutes in parallel. The number of chutes 26 can be adapted, depending upon the number of columns of truss connector plates, generally from a single column up to eight or more parallel columns of truss connector plates. Unlike the prior art, the present invention can be used with any number of columns of truss connector plates in an output stream from a press, whether a single column of truss connector plates or an odd or even number of truss connector plate columns. As is best seen with reference to FIG. 2, the present embodiment of the invention has four chutes 26 to receive a stream S comprising four parallel columns A1, A2, A3 and A4 of truss connector plates T.

In the preferred embodiment, each truss connector plate T proceeds downstream in its respective chute 26 on the receiving assembly 12 by the force of gravity to the downstream end 30 of the receiving assembly 12.

The flipping assembly 14 is best seen in FIGS. 3–9. The flipping assembly 14 is positioned adjacent to the downstream end 30 of the receiving assembly 12. The flipping assembly 14 has a flipping arm 34. The flipping arm 34 flips selected ranks of truss connector plates T onto their opposing faces. The flipping arm 34 has a plurality of pans 36 for receiving one or more truss connector plates T' from the downstream end 30 of the receiving assembly 12. There is one pan 36 corresponding to each chute 26 of the receiving assembly 12, in this case four. The pans 36 each have an upper surface 38 and a lower surface 40. Each pan has a more or less perpendicular lip 42 defining its downstream end. The upstream ends 44 of the pans 36 are flat. The pans 36 may be connected by a transverse connector 46 attached to the lower surface 40 of the each of the pans 36 by fasteners such as bolts 48. Flipping assembly guide chutes 50 are defined by a number of longitudinal guide chute dividers 52 designed to maintain separation of the individual truss connector plates of each column of a stream. The number of guide chutes 50 can be adapted depending upon the number of columns of truss connector plates in a stream, in this case four.

The flipping arm 34 is pivotably attached to a pivot 54 along the transverse axis. The pivot 54 is attached to a flipping assembly frame 56. The flipping assembly frame 56 has a top portion 58 approximately perpendicular to a bottom portion 60, and two opposing side portions 62, and 64. The flipping assembly frame 56 is preferably affixed to the stacking guide 16 by fasteners such as bolts (not shown). The flipping assembly 14 may also be attached to the receiving assembly 12 or may be free standing.

The flipping arm 34 is preferably designed to pivot approximately 90 degrees about the pivot 54 toward the upstream direction, or counter-clockwise as shown in the drawings, in response to an actuating force. The actuating force is provided by an external actuator (not shown) coupled to the flipping arm 34. In the present embodiment, the flipping arm 34 is connected to an electric motor (not shown). The actuating force may be produced by any hydraulic, pneumatic, mechanical or other means for pivoting the flipping arm 34. The flipping arm 34 has a range of motion defined by a top stop 72 and a bottom stop 74, both of which are fastened to the to the top and bottom portions of the flipping assembly frame 58, 60, respectively. The top stop 72 and bottom stop 74, arrest the motion of the flipping arm 34 in the upstream and downstream directions.

The flipping arm 34 has two extreme positions, one at each end of its range of motion. A first position 80 of the flipping arm 34 is shown in FIGS. 1–4. The flipping arm 34 is shown at its other extreme in the second position 82 in FIGS. 5–7. Movement between these positions is regulated by the flipping control assembly (not shown). The flipping control assembly includes receiving sensors 32 to detect the presence or absence of a truss connector plate T in each respective delivery chute 26. Preferably, the sensor assembly 32 has a photo sensor at each chute 26, designated by 32 a, b, c, d, in FIG. 2. Examples of other sensing mechanisms that could be used include, proximity sensors, or magnetic sensors. The receiving sensors 32 sense the imminent arrival of truss connector plates T at the flipping arms 14. The flipping control assembly also includes control circuitry and attendant electrical connections known in the arts (not shown). The flipping control assembly permits selective control of the flipping assembly 14 as further described below.

Figures 4, 5, 6, 7:
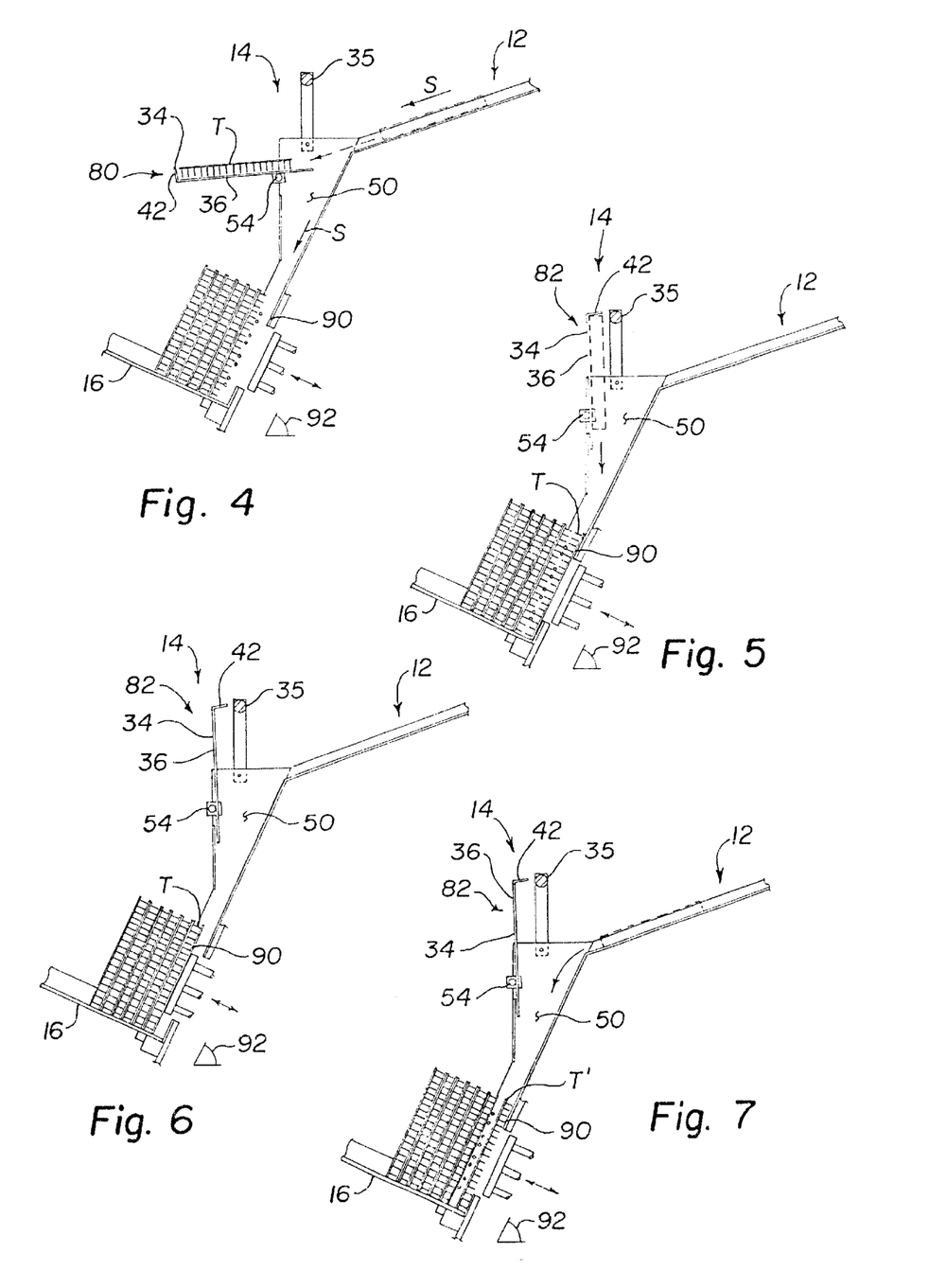
FIGS. 4 through 7 are side views showing the sequence of positions of the stacker apparatus components during a cycle of operation.
Figure 8:
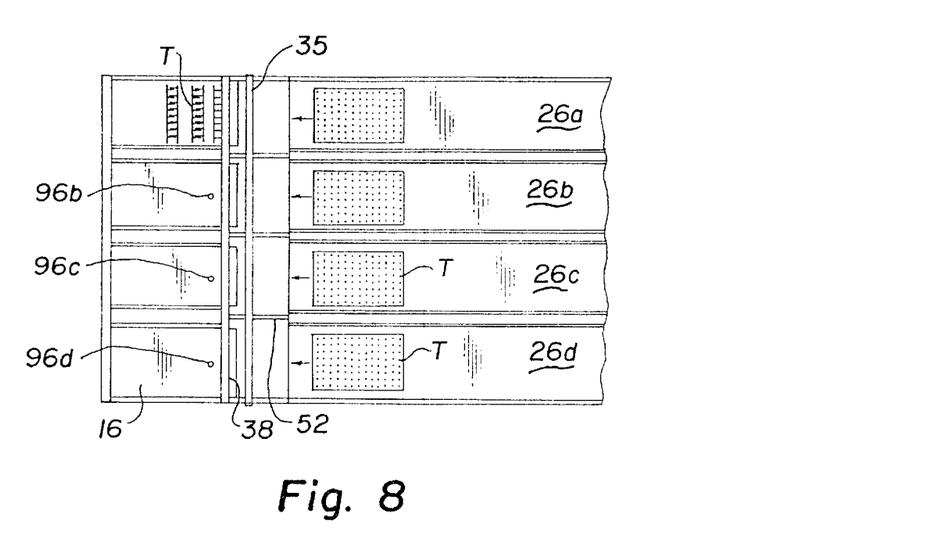
FIG. 8 is a top view of the stacker apparatus as shown and described in FIG. 7.

With reference primarily to FIGS. 4–7, a cycle in the operation of the flipping assembly 14 is described. The flipping control assembly is electrically connected to the external actuator in a way known in the art that permits selective actuation of the flipping arm 34. The flipping arm 34 may move from its first position 80 to its second position 82 and vice versa. The operation of the flipping assembly 14 may begin as shown in FIG. 4 with the flipping arm 34 in the first position 80. This starting position is assumed merely for the purpose of description and it should be understood that the operation may equivalently begin with the flipping arm 34 in the second position 82 as shown in FIG. 5.

In the first position 80 the flipping arm 34 receives truss connector plates T as they move downstream from the receiving assembly 12. The flipping control assembly selectively actuates the flipping arm 34 after a predetermined delay. Upon actuation, the flipping arm 34 rotates about pivot 54 and into the second position 82 shown in FIG. 5. The truss connector plates T on the pans 36 of the flipping arm 34 may be directed by guide bar 35 into the guide chutes 50. Guide bar 35 is positioned above the guide chutes 50 a short distance upstream and below the lip 42 of the flipping arm pans 36 when the flipping arm 34 is in the second position 82, to guide truss connector plates T into the guide chutes 50 as they exit the pans, preferably by the force of gravity. Guide bar 35 is not necessary to practice the invention, but is preferred. The flipping arm 34 remains in the second position 82 until the flipping control assembly again causes the actuator to actuate the flipping arm 34, returning it to the first position 80 (FIG. 4).

When the flipping arm 34 is in the second position 82, truss plate connectors T moving downstream from the receiving ramp 12 are directed into the guide chutes 50 as seen in FIG. 7 bypassing the flipper arm 34. Preferably, the flipping control assembly is preset to flip alternate truss connector plates T, allowing the intervening truss connector plates T to fall into the guide chutes 50 in their original orientations. It will be apparent to one skilled in the arts that the apparatus described could be preset to flip workpieces in any serial manner. For example, flipping every third work piece, every twelfth work piece, or every work piece.

Figure 9:
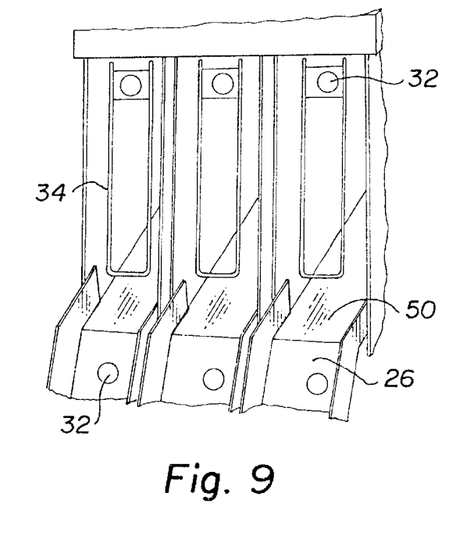
FIGS. 9–12 are top views of an embodiment of the flipping assembly at various stages in the flipping operation.
Figure 10:
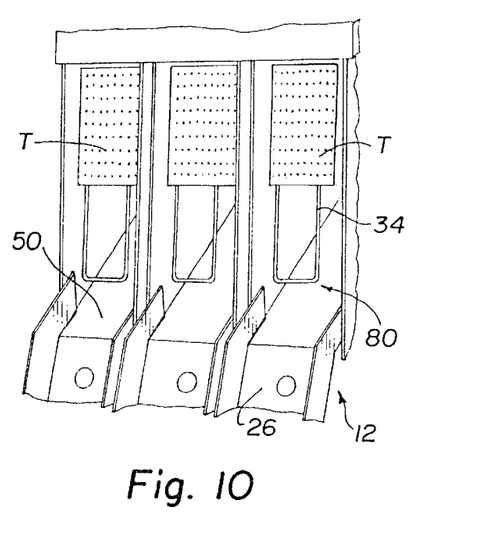

An alternate embodiment of the flipping assembly 14 is shown in FIGS. 9–12. In this embodiment, the flipping arm 34 may begin in the extended position 80, as shown in FIG. 9, although operation may begin with the arm 34 in other positions as well.

Figure 11:
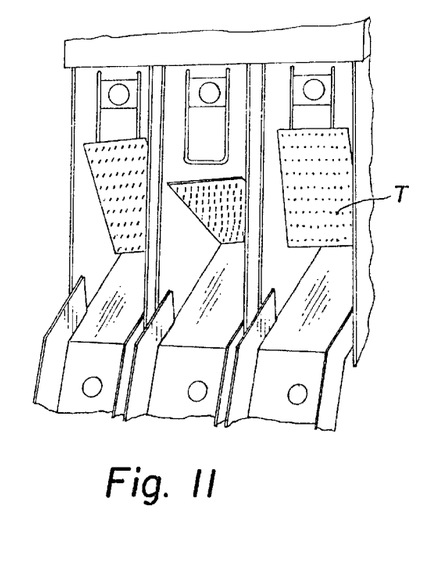
Figure 12:
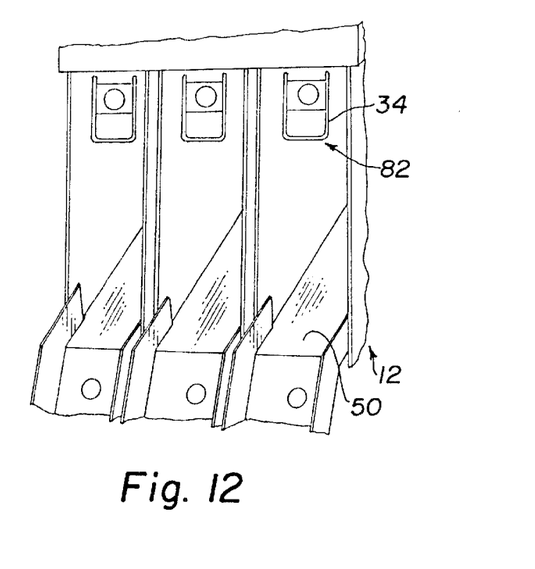

In the first position 80 the flipping arm 34 receives connector plates T as they move downstream from the receiving assembly 12, as show in FIG. 9. The flipping control assembly selectively actuates the flipping arm 34 to move between the first position 80, seen in FIG. 9, and the second position 82, seen in FIG. 12. In the first position 80, the flipper arm 34 is extended to plates T from the receiving assembly 12, seen in FIG. 10. The plates T are received by the flipper arm 34 with one face of the plates, in this case, the tooth-side of the plates, face-up. When the flipper arm is retracted, as shown in FIG. 11, the plates T rotate and fall back into the stream S, into chutes 50, in a reverse orientation, in this case, with the teeth face-down. With the flipper arm 34 in the second position 82, in FIG. 12, plates T may bypass the flipper arm 34, falling directly into chutes 50 without being reoriented. Preferably the flipping arm 34 is actuated to flip alternate plates T as they are received from assembly 12.

It will be apparent to those of skill in the art, that various flipping assembly designs may be employed without departing from the spirit of the invention. The flipping arm may be rotatable, as in FIGS. 4–7, retractable, as in FIGS. 9–12, or of other design.

Continuing downstream, the guide chutes 50 guide workpieces out of the flipping assembly 14 into a stacking guide 16. For the remainder of this discussion, truss connector plates passing downstream after reorientation by the flipping arm 34 will be distinguished by being denoted T'. Truss connector plates which bypass the flipping arm 34 will be denoted T. The truss connector plates reach the stacking guide 16 in either a face-up or face-down orientation after either being received and flipped by the flipping arm 34 (T') or after bypassing the flipping arm (plates T). In the present embodiment, alternate truss connector plates are flipped. Thus, truss plate connectors T are received by the stacking guide 16 from the flipping assembly 14 after bypassing the flipping arm 34, alternating with truss plate connectors T' flipped and received from the flipping arm 34. Preferably, the force of gravity is the prime mover of the truss connector plates T and T' through the guide chutes 50 and into the stacking guide 16. There are many possible variations in the configuration of the stacking guide 16. The stacking guide 16 receives the truss connector plates T, T', from receiving assembly 12 and flipping assembly 14.

In the present embodiment, the stacking guide 16 has, at its upstream end, a face 90 corresponding to each guide chute 50 of the flipping assembly 14. The faces 90 are sloped at an angle 92 appropriate to ensure full contact of the truss connector plates T and T' with the faces 90 due to the force of gravity. In the present embodiment, the angle 92 is approximately 60 degrees from the horizontal. Other angles may be used. The faces 90 include a stacking control assembly 94. The preferred stacking control assembly 94 includes a stacking sensor mechanism 96, in this case a proximity sensor, to indicate the arrival of a truss connector plate T or T' at the faces 90. Each face 90 has an individual stacking sensor mechanism designated by 96 $a, b, c, d$, in FIG. 8. Examples of other sensing mechanisms that could be used include, photo sensors, or magnetic sensors.

Figure 3:
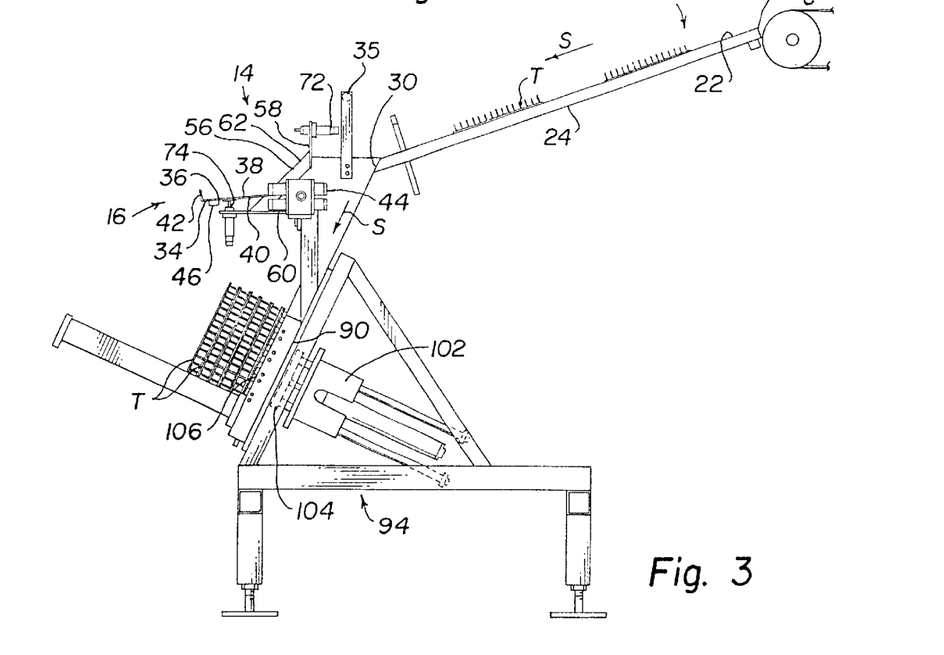
FIG. 3 is a side view of the stacker apparatus of FIG. 1.

The stacking control assembly 94, seen in FIG. 3, may include snubbers to decelerate the truss connector plates T received from the guide chutes 50. An electronic stacking controller is electrically connected to a thruster 102 adjacent to the faces 90. The electronic stacking controller is also electrically connected to the stacking sensor mechanism 96, seen in FIG. 8. The stacking control assembly is preset, as is known in the arts, to activate the thruster 102 after truss connector plates T are detected at the sensors 96. The thruster 102 has arms 104 at each face, for thrusting the truss connector plates through one-way gates 106 located immediately downstream of the truss connector plates T contacting the faces 90. In operation, the thruster 102 thrusts the truss connector plates T one-by-one through the one-way (downstream only) gates 106 and into the adjacent stacks. The stacks rest upon a stack magazine, which is approximately perpendicular to the faces 90, and has channels, defined by stack dividers, to receive truss connector plates T. In the present embodiment, the truss connector plates are received at the faces 90 in alternating face-up or facedown orientations. Thus, the stacks are composed of face-to-face and back-to-back truss connector plates T and T'.

The process of the orienting and stacking apparatus 10 is complete and all or portions of the stacks of truss connector plates can be periodically removed by hand or by machine for further processing or packaging.

Figure 13:
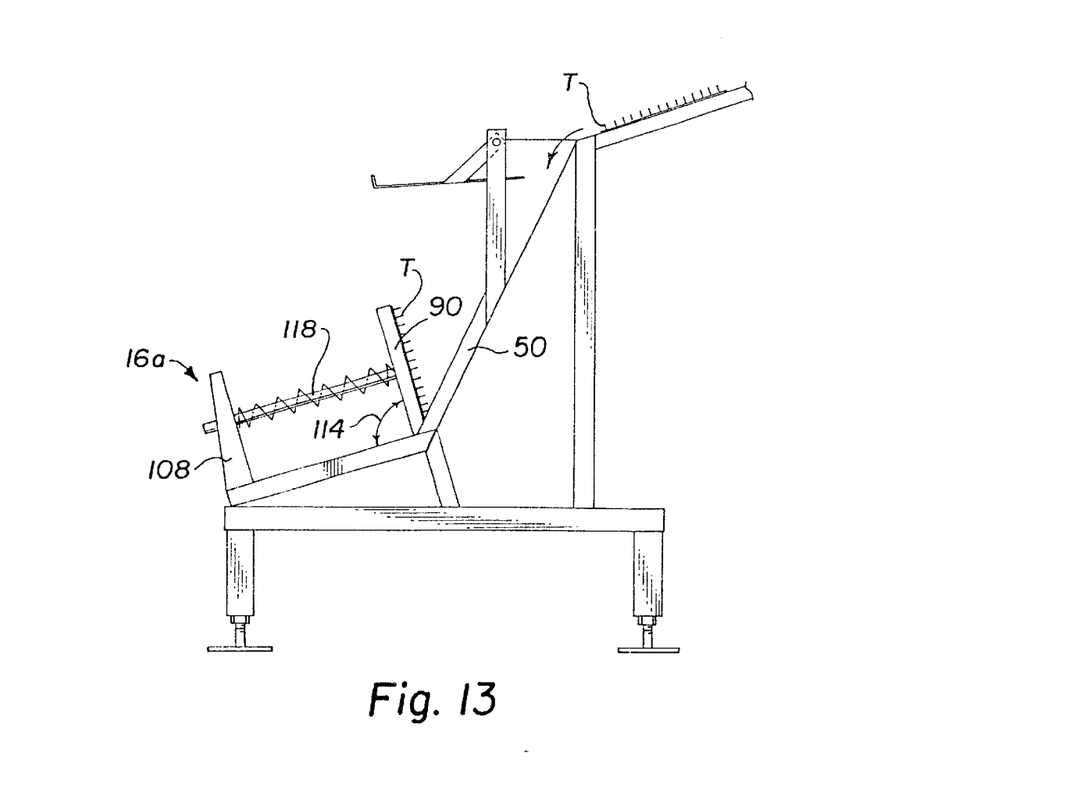
FIG. 13 is a side view of one example of an alternative stacking guide assembly.

The details of the stacking guide 16 can be varied in many ways without departing from the inventions. One example of an alternative embodiment of a stacking guide 16a is shown in FIG. 13. Stacking guide variation 16a may be used in place of stacking guide 16 appearing in FIGS. 1–8. The faces 90 are angled at approximately 60 degrees as in the above-described embodiment, stacking guide 16. Stack magazine 108, is set at an angle 114 approximately 120 degrees from the faces 90. The thruster arms 104 are positioned to thrust the truss connector plate T (or T') causing the truss connector plates to topple into the stack. A tension member 118, in this case a coil spring, maintains the relative position of the stack, as truss connector plates T are added thereto, by exerting an upstream force on a stack plate. A one-way (downstream) pawl mechanism resists the force of the tension member 118 and prevents the movement of the stack upstream past a predetermined point as shown in FIG. 13.

A "cycle of operation" in the above description constitutes a series of steps and corresponding movement of apparatus and workpieces. The series of steps is described up to the point where the events therein would begin to recur, cyclically, as previously described. It should be understood that the cycle of operation is provided for the purpose of demonstrating the concept of the inventions disclosed herein, and unless expressly stated otherwise, the starting point for a cycle of operation could be any one of the events described therein.

The embodiments shown and described above are only exemplary. Many details are often found in the art such as: Truss connector plate streams may be received in a tooth-up or tooth-down orientation; variations in the number of parallel streams; different truss connector plate materials. Therefore many such details are neither shown nor described. It is not claimed that all of the details, parts, elements, or steps described and shown were invented herein. Even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. For example: It would be apparent to one skilled in the art that the apparatus may be arranged to stack truss connectors that exit a punch press in a tooth-down orientation. Additionally, it would be apparent to one skilled in the art to place the escapement assembly at an angle other than sixty degrees, or to provide a mechanical downstream-propelling force in place of gravity.

The restrictive description and drawings of the specific examples above do not point out what an infringement of this of this patent would be, but are to provide at least one explanation of how to make and use the inventions. The limits of the inventions and the bounds of the patent protection are measured by and defined in the following claims.

What is claimed:

1. An apparatus for orienting and stacking truss connector plates wherein each of the truss connector plates comprises opposing faces, a face side and a back side, and it is desired to stack the truss connector plates in a face-to-face or back-to-back orientation, comprising:
    a receiving assembly for receiving a continuous stream of truss connector plates, the continuous stream having at least one column of truss connector plates;
    a flipping assembly for selectively flipping alternating truss connector plates in the at least one column to their opposing faces; and
    a stacking guide for guiding the truss connector plates into stacks.

2. An apparatus according to claim 1, the flipping assembly further comprising:
    a flipping arm movable between two selectable operative positions; a first position for receiving truss connector plates from the receiving assembly, and a second position for placing truss connector plates on the stacking guide.

3. An apparatus according to claim 2, the flipping assembly further comprising:
    a flipping control assembly operably connected to the flipping assembly, for selectively controlling the operation of the flipping arm.

4. An apparatus according to claim 2 further comprising:
    a flipping control assembly operably connected to the flipping assembly for sensing the presence of a truss connector plate on the flipping arm and selectively controlling the operation of the flipping arm.

5. An apparatus according to claim 2, wherein the flipping arm is rotatable.

6. An apparatus for orienting and stacking connector plates wherein each of the connector plates comprise opposing faces, a face side and a back side, and it is desired to stack at least some of the connector plates in a face-to-face or back-to-back orientation, comprising:
    a receiving assembly for receiving a continuous stream of connector plates, the continuous stream having at least two columns of connector plates, the columns having a plurality of ranks of connector plates;
    a flipping assembly for selectively flipping alternating plates within the columns of connector plates to their opposing faces; and
    a stacking guide for guiding connector plates into stacks.

7. An apparatus as in claim 6, the flipping assembly further comprising:
    a flipping arm with two selectable operative positions; a first position for receiving one rank of connector plates from the receiving assembly, and a second position for directing the rank of connector plates to the stacking guide.

8. An apparatus as in claim 7 further comprising:
    a flipping control assembly operably connected to the flipping assembly for sensing the presence of a rank of connector plates on the flipping arm and selectively controlling the operation of the flipping arm.

9. An apparatus as in claim 7 wherein the flipping arm is rotatable.

10. An apparatus as in claim 6, the flipping assembly further comprising:
    a flipping control assembly operably connected to the flipping assembly, for sensing the presence of a rank of connector plates on the flipping arm and selectively controlling the operation of the flipping arm.

11. An apparatus as in claim 6 wherein:
    a selected rank of connector plates bypasses the flipping arm when the flipping arm is in the second position and is directed to the stacking guide.

12. A method of orienting and stacking connector plates wherein each of the connector plates comprises opposing faces, a face side and a back side, and it is desired to stack at least some of the connector plates in a face-to-face or back-to-back orientation, comprising the steps of:
    receiving a continuous stream of connector plates, the stream having at least one column of connector plates;
    selectively flipping alternating connector plates in said at least one column to their opposing faces; and
    stacking the connector plates.

13. The method of claim 12 wherein:
    the step of selectively flipping at least one work piece to its opposing face further comprises flipping the at least one work piece using a flipping arm.

14. The method of claim 13 wherein:
    the flipping arm is selectably movable between a first position for receiving at least one work piece from the receiving assembly, and a second position for directing the at least one work piece to the stacking guide.

15. A method of claim 13 wherein:
    the flipping arm is rotatable.

* * * * *

UNITED STATES PATENT AND TRADEMARK OFFICE
CERTIFICATE OF CORRECTION

PATENT NO. : 6,468,024 B2
DATED : October 22, 2002
INVENTOR(S) : Bishop et al.

It is certified that error appears in the above-identified patent and that said Letters Patent is hereby corrected as shown below:

<u>Column 2,</u>
Lines 64 and 67, change "producing-producing" to -- workpiece-producing --;

<u>Column 4,</u>
Line 41, delete "to the", second occurrence; and

<u>Column 5,</u>
Line 44, change "show" to -- shown --.

Signed and Sealed this

Eighteenth Day of February, 2003

JAMES E. ROGAN
*Director of the United States Patent and Trademark Office*